United States Patent
Dhumale et al.

(10) Patent No.: US 8,751,453 B1
(45) Date of Patent: *Jun. 10, 2014

(54) SYSTEM AND METHOD FOR CONVEYING BACKUP AND RESTORE DATA VIA EMAIL

(75) Inventors: Ajit Vishnu Dhumale, Pune (IN); Mukul Kumar, Pune (IN); John Richard Swift, Ottawa (CA); Atul Avinash Nene, Pune (IN); Anand Gopinath Das, Pune (IN)

(73) Assignee: Symantec Operations Corporation, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/295,712

(22) Filed: Nov. 14, 2011

Related U.S. Application Data

(63) Continuation of application No. 11/333,012, filed on Jan. 17, 2006, now Pat. No. 8,060,473.

(51) Int. Cl.
*G06F 7/00* (2006.01)
*G06F 17/00* (2006.01)

(52) U.S. Cl.
USPC .......................................................... 707/640

(58) Field of Classification Search
None
See application file for complete search history.

(56) References Cited

U.S. PATENT DOCUMENTS

| | | | |
|---|---|---|---|
| 7,251,680 B2 * | 7/2007 | DeVos | 709/206 |
| 2004/0235523 A1 * | 11/2004 | Schrire et al. | 455/558 |
| 2004/0260973 A1 * | 12/2004 | Michelman | 714/13 |
| 2007/0061385 A1 * | 3/2007 | Clark et al. | 707/204 |
| 2008/0005202 A1 * | 1/2008 | Zhang et al. | 707/204 |
| 2009/0249011 A1 * | 10/2009 | Ohishi | 711/162 |

* cited by examiner

*Primary Examiner* — Rehana Perveen
*Assistant Examiner* — Raheem Hoffler
(74) *Attorney, Agent, or Firm* — Campbell Stephenson LLP

(57) ABSTRACT

Various methods and systems for using email to convey backup and restore data are disclosed. One method involves: receiving a request to perform a backup system operation; generating an email that includes data and metadata (which is associated with the data); and sending the email to an email address associated with a backup system component. The request can be a backup request, in which case the data includes data to be backed up, and the backup system component is a backup server. Alternatively, the request can be receiving a restore request. In this scenario, the data includes data to be restored, and the backup system component is a backup client.

16 Claims, 6 Drawing Sheets

SYSTEM AND METHOD FOR CONVEYING BACKUP AND RESTORE DATA VIA EMAIL

RELATED APPLICATION

The present patent application is a continuation of U.S. patent application Ser. No. 11/333,012, filed on Jan. 17, 2006 now U.S. Pat. No. 8,060,473, entitled "System and Method For Conveying Backup and Restore Data Via Email", and is incorporated by reference herein in its entirety and for all purposes. The applications are assigned to Symantec Operating Corporation the assignee of the present invention, and hereby incorporated by reference, in its entirety and for all purposes.

FIELD OF THE INVENTION

This invention relates to data storage systems and, more particularly, to performing backups and restores of data in data storage systems.

DESCRIPTION OF THE RELATED ART

Backup systems are used to protect data against loss. Typically, a backup system includes software that periodically copies user data to a backup storage device (e.g. such as a tape drive). If data is lost (e.g., due to user error or device failure), the backed-up copy of the data can be retrieved from the backup storage device.

Many organizations implement a network-based backup system in order to ensure that the organization's data is regularly backed up. For example, a company can implement a network-based backup system to ensure that employees' data is backed up on a daily basis. Data that is stored on storage devices connected to the network is then backed up at regular intervals.

Portable computing devices, like personal digital assistants (PDAs), mobile phones, and laptop computers, often store data that has significant value to an organization. Accordingly, it is desirable to have the centralized network-based backup system backup the data that is stored on such portable computing devices. Due to their nature, however, such portable devices are not always directly connected to the network on which the backup system resides. This can prevent the network-based backup system from backing up or restoring data on portable computing devices while the devices are not connected to the network. Data that is created or modified during such periods is vulnerable since it cannot be backed up.

Additionally, data cannot be restored on a portable computing device while the portable computing device is not connected to the network. This can leave traveling employees stranded without access to critical data. As the above examples show, it is desirable to have mechanisms that allow backups and restores of data stored on portable computing devices even when the portable computing devices are not connected to a centralized network.

SUMMARY

Various embodiments of methods and systems for using email to convey backup and restore data and metadata are disclosed. In one embodiment, a method involves: receiving a request to perform a backup system operation; generating an email that includes data and metadata (which is associated with the data); and sending the email to an email address associated with a backup system component. The request can be a backup request, in which case the data includes data to be backed up, and the backup system component is a backup server. Alternatively, the request can be receiving a restore request. In this scenario, the data includes data to be restored, and the backup system component is a backup client.

The foregoing is a summary and thus contains, by necessity, simplifications, generalizations and omissions of detail; consequently those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

A more complete understanding of the present invention may be acquired by referring to the following description and the accompanying drawings, in which like reference numbers indicate like features.

Figure 1:
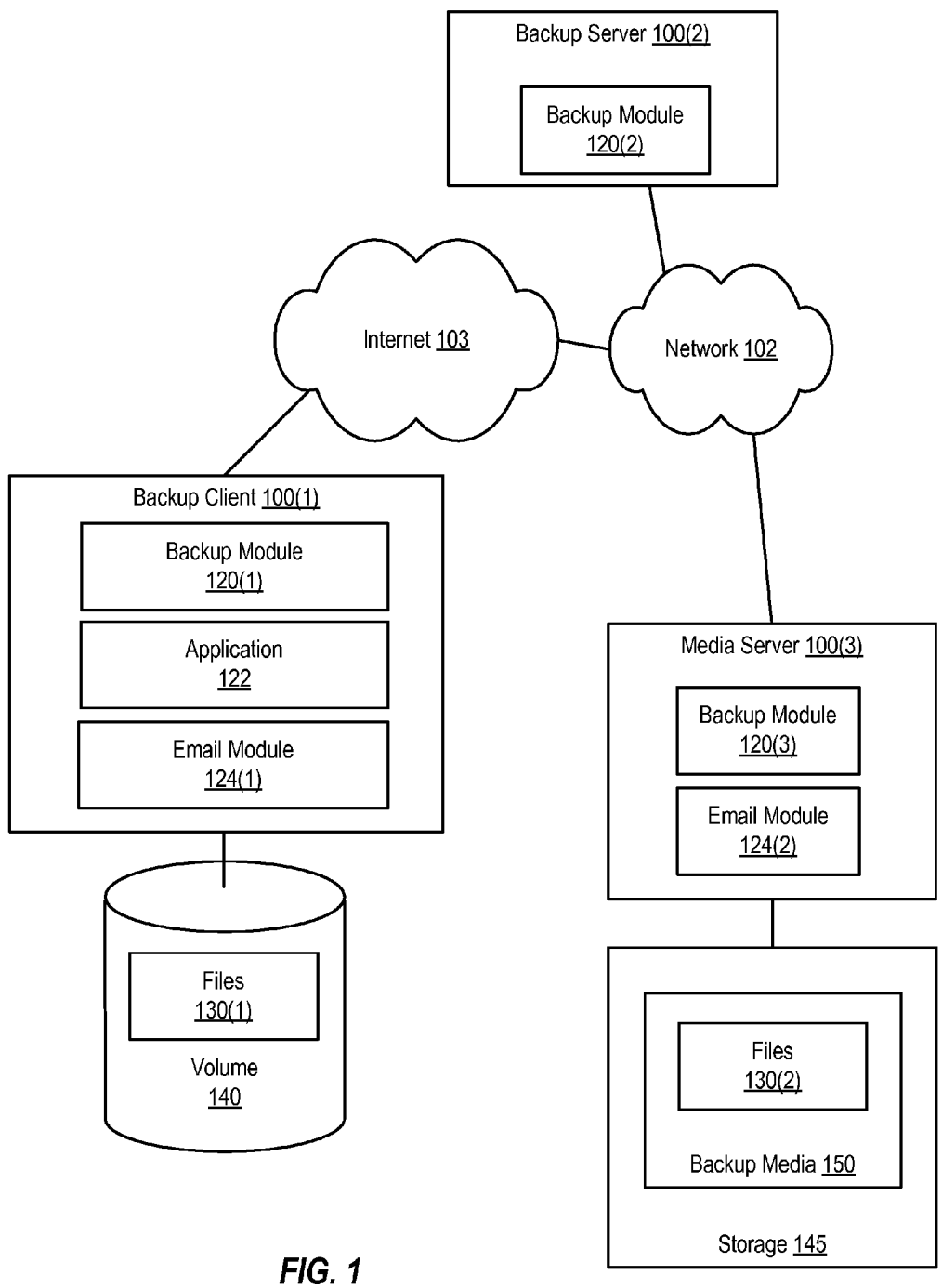
FIG. 1 is a block diagram of a system for performing backups and restores using email, according to one embodiment of the present invention.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

FIG. 1 is a block diagram of a data storage system. The components in FIG. 1 can perform backups, full restores from backups, and selective restores of individual tiles from backups. FIG. 1 includes a backup client 100(1), a backup server 100(2), and a media server 100(3). Backup server 100(2) and media server 100(3) are coupled by a network 102. Backup client 100(1) can also connect directly to network 102. However, in this example, backup client 100(1) is instead coupled to network 102 by Internet 103. As shown, backup client 100(1) can communicate with backup server 100(2) and media server 100(3) (e.g. using techniques such as email and instant messaging), even though backup client 100(1) does not have direct access to network 102.

Network 102 can include one or more WANs (Wide Area Networks), LANs (Local Area Networks), and/or one or more SANs (Storage Area Networks). Network 102 can include a WAN (Wide Area Network), such as the Internet, one or more LANs (Local Area Networks), and/or one or more SANs (Storage Area Networks). Network 102 can be implemented using various media, including coaxial cables, fiber optic cables, and wireless links. In general, network 102 presents a secure network that allows various computing devices to communicate with each other as well as with the backup system that includes backup server 100(2). Network 102 may implement various security techniques, such as firewall techniques, that make it difficult for certain types of communication to take place between devices that are directly connected to network 102 and devices that are indirectly connected to network 102.

As shown, backup client 100(1), backup server 100(2), and media server 100(3) each include backup and restore client software or agents implemented by backup modules 120(1), 120(2), and 120(3). Such agents typically receive instructions from backup server 100(2) and handle the extraction and placement of data for the backup client 100(1). Together, the backup and restore agents can backup and restore information stored on the client system. In one embodiment, backup modules 120(1)-120(3) are implemented using VERITAS Net-Backup™ or VERITAS BackupExec™ software, available from Symantec Corporation of Cupertino, Calif.

In addition to backup module 120(1), backup client 100(1) implements application 122 and email module 124(1). Application 122 accesses files 130(1), which are stored on volume 140. Email module 124(1) is configured to send and receive email (e.g., by communicating with an email server). Applications such as backup module 120(1) and application 122 can send and receive email using email module 124(1).

Backup client 100(1) is coupled to (or, alternatively, includes) a storage device, volume 140. Volume 140 is a physical or logical storage device that stores one or more files 130(1). Volume 140 can include one or more physical storage devices (e.g., in one embodiment, volume 140 is implemented on a storage array that includes several independent hard drives). Application 122 executing on backup client 100(1) can access (e.g., read and write) files 130(1) stored on volume 140. It is noted that in other embodiments, the information stored on volume 140 could be organized using data objects (e.g. database records, object-based storage, and the like) other than files.

Backup server 100(2) includes backup module 120(2), which initiates backups of client data. For example, backup module 120(2) can include a user interlace that allows an administrator to specify when client data (such as file data 130(1), which is maintained by backup client 100(1)) should be backed up. Backup module 120(2) can also control media server 100(3) and interact with backup client 100(1).

Media server 100(3) implements backup module 120(3), which participates in backup system operations (such as backups and restores) under direction from backup server 120(2). In this example, backup module 120(3) creates a backup by copying information the information stored on volume 140 to backup media 150 (backup media 150 is part of a pool of storage 145, which can include various types of storage devices, that is accessible to media server 100(3)). As shown, a point-in-time copy (files 130(2)) of files 130(1) can be stored on backup media 150. Backup media 150 can include sequential storage media such as magnetic tape as well as random access media such as hard disk drives, optical disks (e.g., CDs (Compact Discs) and DVDs (Digital Versatile Discs), and the like).

When backup client 100(1) is not directly connected to network 102, backup module 120(1) is configured to send data (e.g., such as all or part of files 130(1)) that is to be backed up to media server 100(3) via email. In particular, backup module 120(1) is configured to collect the necessary data and metadata, which describes the data, package the data and metadata in an email (e.g., by incorporating the data and metadata into the body of the email or by incorporating the data and metadata into an attachment to the email), and send that email to backup module 120(3). In some embodiments, the email is secured in some fashion (e.g., the email is encrypted, includes a security certificate, or the like). The source of the email (backup module 100(1)) can be identified either by the source email address of the email message or by information included within the email itself.

The metadata that is included in the email describes the data by describing characteristics such as, for example, the data's location (e.g. within a file, a logical volume, or a physical storage device), status, permissions, and the like. The metadata can be retrieved by accessing a file system and/or volume manager application (either or both of which can, in some embodiments, be integrated with the backup module).

Backup module 120(1) can send an email that contains backup data in response to requests for backup (e.g. as received from a user or from backup server 100(2)). Backup module 120(1) can also send such emails periodically, at prescheduled times, or in response to certain events.

Backup module 120(1) generates the backup information and sends the emails without user assistance. The backup transaction can be transparent to the user of backup client 100(1), such that the user is unaware that the backup module is sending email to the backup server (or vice versa). Backup module 120(1) sends the emails to an email address that is associated with backup module 120(3). Backup module 120 (3) has access to emails sent to that email address.

The email will be delivered to backup module 120(3) using standard email techniques. Upon receiving the email, backup module 120(3) decrypts the email (if the email is encrypted) and extracts the data and metadata included within (as noted above, this information can be included within the body of the email or within an attachment to the email). Backup module 120(3) then backs up the data by storing a copy to backup media 150. In some embodiments, backup module 120(3) receives and processes the email automatically, without user assistance.

It is noted that, in some embodiments, backup client 100(1) can also participate in traditional network-based backup techniques whenever backup client 100(1) is directly connected to network 102. In some such embodiments, backup module 120(1) can detect whether backup client 100(1) is directly connected to network 102 and select which type of backup techniques (network-based or email-based) to use dependent upon whether a direct connection to network 102 is present. Similarly, if restores are being performed, backup module 120(3) can detect whether backup client 100(1) is currently present in the network in order to select whether to perform a network-based or email-based restore.

Using email to transfer backup information allows data stored on a particular device to be backed up, regardless of whether that device currently has a connection to the network-based backup system. This allows, for example, employees who are traveling to backup their data while away from the office. It also allows the backup information (e.g., the data being backed up and the metadata that describes that data) to be emailed to the media server at times that the backup client is available, regardless of the availability of the media server. The email can be stored by an email server until the media server retrieves its messages from the email server. Once the email message has been retrieved by the media server, the media server can process the email message and perform the backup (this processing can be delayed, if desired). Accordingly, even if the backup client is not available (e.g., due to not having access to network and/or email or due to being powered off) at the time that the media server typically performs backups, the data stored by that backup client can still be backed up from the email.

Email can also be used to restore data to a backup client. For example, in response to receiving a user request to restore data, backup module 120(1) can send an email requesting a restore to backup module 120(3). In response, backup module 120(3) collects the appropriate data and metadata, includes this information within an email, and sends the email to backup module 120(1). Backup module 120(1) can then restore the data from the email to volume 140.

Being able to restore data to backup clients that are not currently connected to the network can provide several advantages. For example, if a sales engineer is at a customer site and loses data stored on her PDA, the sales engineer can access the request a restore from the backup module (e.g. via a user interface) on the PDA. The backup module on the PDA will email the media server, which will in turn email the needed data and metadata back to the PDA. Accordingly, despite the PDA not being connected to the network that implements the backup system, the lost data can still be restored.

Similar techniques can be used to initialize a replacement device. If an employee has to replace a portable computing device while away from the office (e.g., due to loss, destruction, or theft of the employee's original portable computing device), the employee can request a restore of the original data to the replacement device. In one embodiment, the backup system can use the employee's user identity to select the data that should be restored to the new portable computing device (e.g. the backup module on the replacement device can include the employee's user ID in the email that is sent to request the restore).

As with backups, various functions that are performed as part of a restore that is based on emailed restore information (e.g. the data retrieved from the backup as well as the metadata that describes that data) can be time delayed. For example, if the backup client is unavailable when the media server sends the email message that includes the restore information, the email message will be stored by an email server until the backup client checks for new email messages. At that time, the backup module on the backup client can process the email and perform the restore. Similarly, if a substantial amount of time is needed to obtain the data to be restored (e.g., because that data is stored on a tape that is located in a vault at a remote location), a significant amount of time may pass between the time that the backup client requests a restore and the time that the media server sends the email with the requested restore information. Since the restore information is sent via email, the backup client will be able to retrieve the restore information, even if the backup client is not available (e.g., due to being away from email and/or the network or due to being powered off) when the media server sends the email.

In one embodiment, modifications to files 130(1) are prevented while backup information is being created (this information is then emailed to the media server). In such an embodiment, the backup information is created by copying information directly from volume 140 to a data structure that will be included in the email. In other embodiments, a point-in-time copy (e.g. a copy-on-write snapshot, a mirror-breakoff snapshot, or the like) of the information stored on volume 140 is first created, and the backup information is created by copying the information in the point-in-time copy into the email. Each backup can be a full backup (e.g. a complete copy of all files and other information stored on volume 140) or an incremental backup (e.g. a partial copy, which includes only the files and other information that have been modified since the last backup was created).

It is noted that, while the functionality of backup modules 120(1)-120(3) has been divided into client, server, and media server functionality in the embodiment of FIG. 1, this functionality can be combined and/or rearranged in other embodiments. For example, in an alternative embodiment, backup module 120(2) can include media server functionality (provided by backup module 120(3) in FIG. 1), eliminating the need for a separate media server.

Backup client 100(1), backup server 100(2), media server 100(3), and search server 100(4) can each include one or more computing devices configured to execute software implementing various applications (e.g., application 122, backup modules 120(1)-120(3), email modules 124(1)-124(2), and the like). In such embodiments, each computing device can include a workstation, personal computer, server, Personal Digital Assistant (PDA), cell phone, storage network switch, storage device, storage array controller, or any other device configured to execute software implementing such applications. Alternatively, each computing device can be implemented from hardware (e.g., logic devices such as programmable logic devices (PLDs), field programmable gate arrays (FPGAs), and the like) configured to perform the functions of such applications, or from a combination of hardware and software implementing the functionality of the applications.

Figure 2:
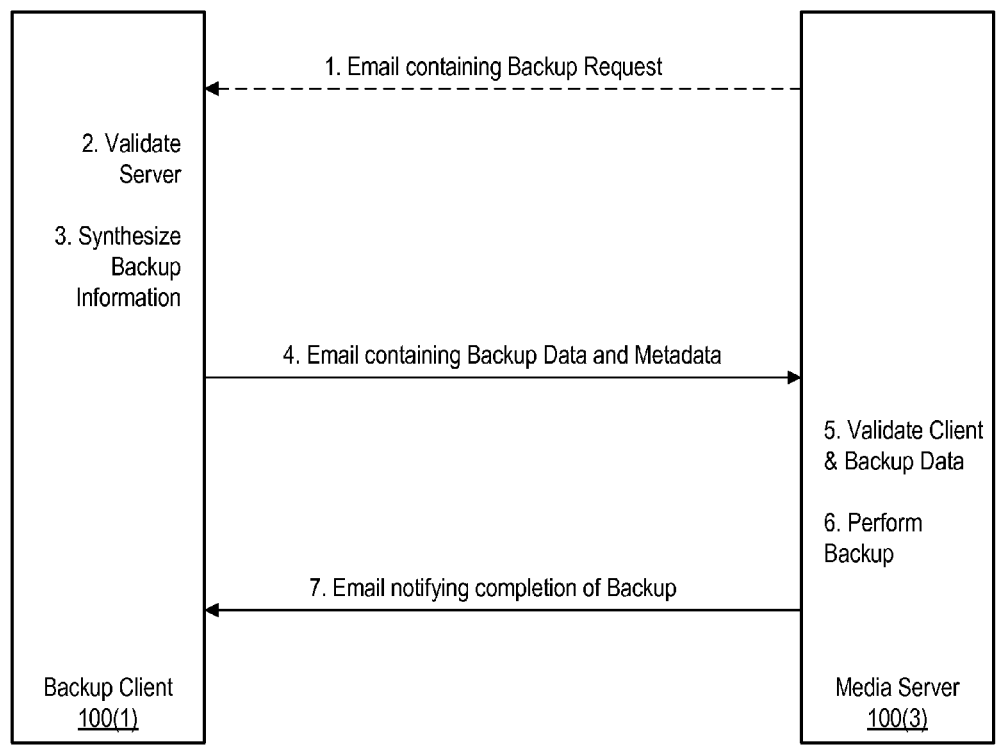
FIG. 2 is a block diagram of a system for performing a backup using email to convey the backup data and metadata to the backup server, according to one embodiment of the present invention.

FIG. 2 is a block diagram of a system that performs an email-based backup. As shown, backup client 100(1) is configured to exchange email with a backup server such as media server 100(3).

Backup client 100(1) detects that a backup should be initiated. In the illustrated example, backup client 100(1) detects this in response to (1) receiving a request contained in an email from media server 100(3) (this email is represented by a dashed line, since it is optional). However, such a request could also be received locally (e.g. a user could select to perform a backup via a user interface implemented on backup client 100(1)). The request can identify which data to back up (e.g., by identifying selected volumes, files, database records, or the like). As another alternative, instead of receiving an explicit request, backup client 100(1) could simply detect that a backup should be initiated based on prespecified criteria (e.g., such criteria could indicate that backups should be initiated periodically, at prescheduled times, and/or in response to various prespecified events).

If the request is received via an email from the media server, backup client 100(1) can optionally (2) validate the server by performing a security function based on the received email. For example, if encryption is being used, backup client 100(1) can decrypt the email. Backup client can also (or alternatively) validate the source email address (the email address that identifies the sender of the email). Validation can also involve verifying information (e.g. user identification and/or passwords) included within the email. The backup client will not initiate the backup if verification is unsuccessful.

In response to detecting that a backup should be initiated, backup client (3) synthesizes the backup information to transmit to the backup server. Synthesizing the backup information involves creating a copy of the data to be backed up (the backup data) as well as metadata that describes that data. If a full backup is being performed, the backup client can copy all information selected for backup. If an incremental backup is being performed, the backup client can copy only that information that has changed since the last backup. The backup client can then package (e.g., by compressing) the data and metadata for transmission via an email. The backup information (backup data and metadata) is included in the email by either inserting the backup information into the body of the email or by including the backup information in one or more attachments to the email. It is noted that the backup information can also be included in both the body and an attachment (e.g., metadata can be included in the body of the email, while the backup data is included in one or more attachments).

The backup client then (4) sends an email containing the backup data and metadata to the backup server. This email can be encrypted or include other security information usable to verify the backup client and/or the backup data included within.

Media server 100(3) receives the email and (5) validates the client and/or the backup data included with the email. As noted above, verification can involve decrypting the email and/or verifying the source email address or other information included within the email.

If verification is successful, media server 100(3) (6) performs the backup by copying the backup data to a backup medium. Media server 100(3) can use the metadata when performing the backup. For example, if the backup is being performed at the file level, the metadata can identify the location of files within the file system hierarchy, permissions (e.g. indicating which users have permissions to access each file being backed up), status (e.g., such as the time that the file was last modified, the file's author, and the like), and so on. Similarly, if the backup is being performed at the volume level, the metadata can identify the location in which each block or extent of data is stored on the client. Such metadata can be used to, for example, control access to the backed up data, to store the backed up data in an appropriate backup location, and so on. The media server can use this metadata to update a backup catalog that describes and/or controls access to data that has been backed up. Once the backup has been performed, the media server can (7) send an email to the backup client to notify the backup client that the backup is complete.

It is noted that, throughout the backup process, both the backup client and the media server can create and process emails automatically (i.e., without requiring human intervention under normal operating conditions). The process of sending and receiving emails can be transparent to users, such that a user is unaware that email is being used to transmit backup information.

Figure 3:
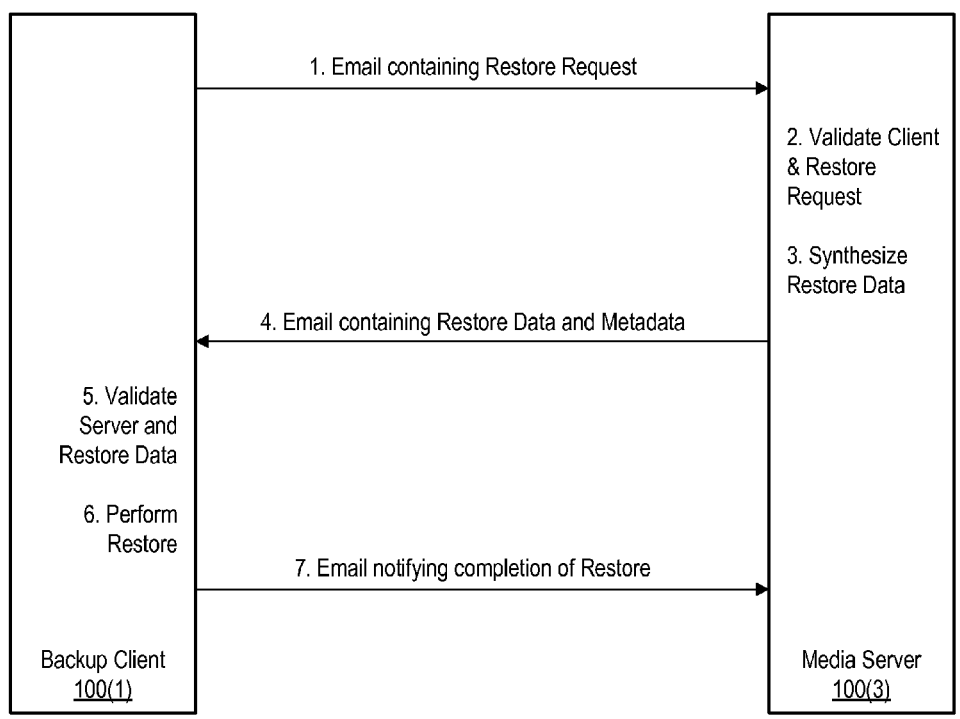
FIG. 3 is a block diagram of a system for performing a restore using email to convey the restore data and metadata to the backup client, according to one embodiment of the present invention.

FIG. 3 is a block diagram of a system for performing a restore by using email to convey the restore data and metadata to the backup client. As in FIG. 2, backup client 100(1) is configured to exchange email with a backup server such as media server 100(3).

The restore process begins when the client requests that a restore be initiated. In FIG. 3 the request is sent (1) in an email from backup client 100(1) to media server 100(3). However, the request could also be submitted via the network in which the backup system resides, if the backup client has access to the network when the request is made. The request identities the data to be restored (e.g. by identifying a particular volume, file, extent, database record, or the like). The request can identify the backup client making the request and/or the email address to which the restore data should be sent (the media server can, in some embodiments, identify the appropriate email address if the client is known).

In one embodiment, the email includes special commands (identifying that a restore should be initiated) that are interpreted by the media server automatically, without manual intervention. These commands can be sent either in the subject of the email or the body of the email, using techniques similar to those used to convey standard list-server commands.

The email can be transferred to the media server via a standard email server. Alternatively, media server 100(3) can include functionality to directly receive emails, without the need for a separate email server. The media server receives the email and (2) validates the backup client and the restore request. As described above, validation can be performed by decrypting the email, validating the source email address, by verifying information included in the email, and the like.

On receipt of a restore request, the media server (3) synthesizes the requested restore data from backup. Here, the media server looks up the requested data in the backup catalog to identify the location of the data on the backup media and restores the requested data from backup. The media server can then package the requested data and associated metadata (e.g., identifying the location of the requested data on the backup client's storage device) for transmission (e.g., by packaging the data in binary format, compressing the data, and the like). The packaged data is included in the body of or an attachment to the email (e.g., a mime attachment or a uu-encoded stream embedded in the email). The email can also include one or more commands that should be performed by the backup client to effect the restore.

The media server then (4) sends the email to the email address of the backup client that requested the restore. This email is received and (optionally) validated (5) by the backup module on the backup client. The backup module then processes the email in order to perform the restore (6).

In one embodiment, the email sent by the media server includes human readable instructions for extracting and restoring the data. For example, if the restore request specified a particular file, the email can include that tile (either in compressed or uncompressed form) as an attachment and instructions directing the email recipient to save the file locally to complete the restore operation. In such an embodiment, the backup module processes the email by notifying a user that an email has been received from the backup server. The user then follows the instructions to effect the restore.

In other embodiments, the email sent by the media server includes commands that can be processed by the backup module without any human intervention (at least under normal operating conditions). The restore data can be packaged in a format that can be extracted and restored by the backup module on the backup client. The backup module can either be configured to process the data appropriately or to parse the email for commands that will effect the restore. In the latter situation, the backup server (media server 100(3) in this example) will include commands that are recognizable by the backup client within the email. For example, the email can include the restore data as well as commands that, when executed by the backup module on the backup client, save the attachment locally.

In still other embodiments, the email contains an executable configured to extract the data and restore the data on the backup client. When processing the email to effect the restore, the backup module on the backup client can either save and initiate the executable automatically or notify a user, allowing the user to save and initiate the executable.

Once the restore has been performed, the backup client can optionally notify (7) the backup server that the restore operation is complete by sending another email to the backup server. For example, the backup module (or a human) can reply to the email received from the backup server.

In both FIGS. 2 and 3, the backup system components (the backup client and backup server) have been described as implementing a security mechanism to allow emails and/or transmitted data to be verified. As noted above, such security mechanisms can be implemented using an encryption system to encrypt and decrypt emails. Additionally, such security mechanisms can use certificates (e.g., Secure Socket Layer (SSL) certificates) to perform verification. For example, a sending device can include a certificate in each email. The receiving device then verifies the email based on the certificate included within.

In general, the security mechanisms allow the backup server to identify whether an email (e.g., an email containing a restore request) originates from a valid backup client and/or email address. The security mechanisms also allow the backup client to identify whether an email originates from a valid backup server and/or email address.

Using email as a backup system transport for backups and restores allows backups and restores to be performed for mobile computing devices that do not have access to the network in which the network-based backup system is implemented. Additionally, the use of email as a transport allows restores to be performed in time-deferred mode, if the target client leaves the network after sending a restore request.

The techniques described above can also be used in situations involving backup clients located in remote offices. Traditionally, backups involving remote offices have been accomplished by replicating the data from the remote offices to a central office, where a standard backup system can then backup the replicated data. When replication is used, however, restoring data to a remote office requires that either a second reverse replication channel be implemented from the central office to the remote office or that the replication system support bi-directional replication. Either of these solutions can be prohibitively expensive. If, however, email is used to transfer restore information from the backup server to backup client(s) at the remote office, it is unnecessary to implement a reverse replication channel or bi-directional replications.

Figure 4:
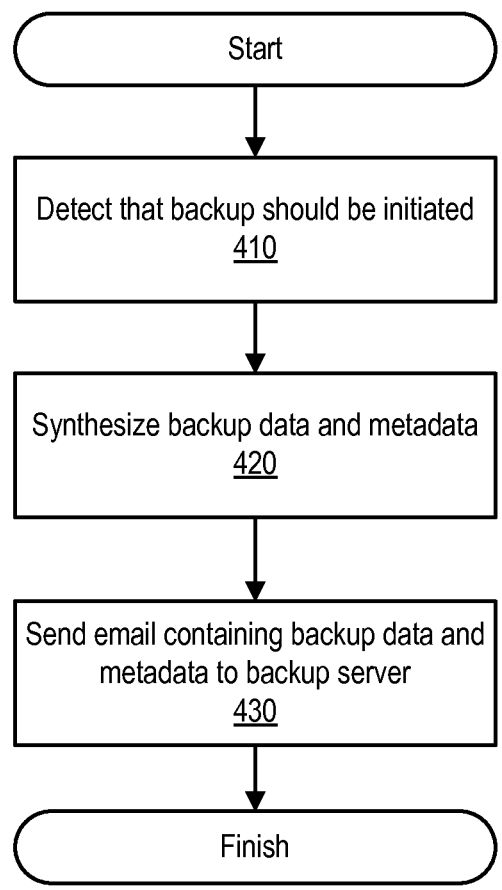
FIG. 4 is a flowchart of one embodiment of a method of performing a backup using email to convey backup data to the backup server.

FIG. 4 is a flowchart of one embodiment of a method of initiating a backup using email to convey backup data to the backup server. This method can be performed by a backup module within a backup client (e.g. backup module 120(1) of FIG. 1).

The method begins at 410, when the backup module detects that a backup should be initiated. As noted above, this detection can be made in response to receiving a request (e.g. from a user or from a backup server) or in response to certain prespecified conditions. For example, if periodic incremental backups are being generated, the backup module will initiate a new incremental backup each period. The backup module can also be configured to initiate backups at prespecified times.

At 420, the backup module synthesizes the backup data and metadata, using the techniques described above. The backup can be performed at the file level or at the volume level, and thus the metadata can describe files (or portions of files) and/or units of data on one or more volumes. The backup module can package the data for transmission by formatting the data, compressing the data, and the like.

At 430, the backup module sends an email that includes the backup data and metadata to a backup server (such as media server 100(3) of FIG. 1). The backup data and metadata can be included in the body of and/or an attachment to the email. The email can be encrypted and/or contain security information. The email is sent to an email address associated with a backup module implemented on a backup server.

Operations 410, 420, and 430 can be performed automatically, without human intervention. It is noted that other operations can be included instead of and/or in addition to those operations shown in FIG. 4.

Figure 5:
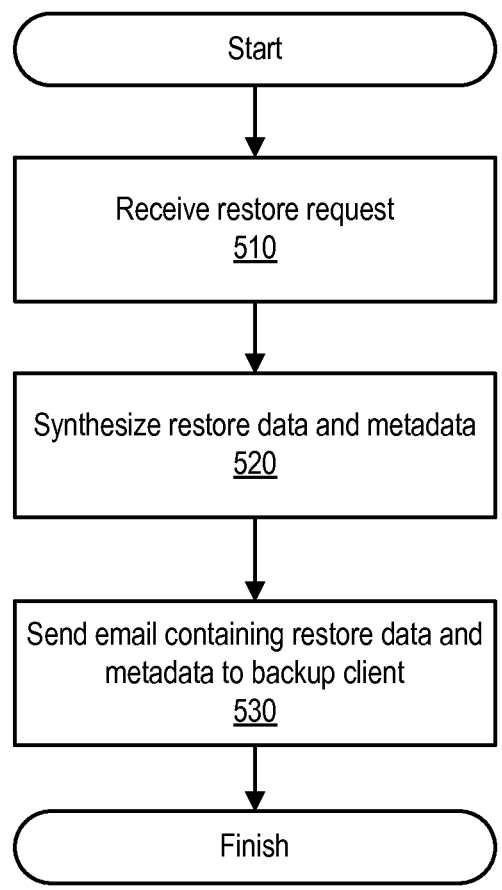
FIG. 5 is a flowchart of one embodiment of a method of performing a restore using email to convey restore data to the backup client.

FIG. 5 is a flowchart of one embodiment of a method of performing a restore using email to convey restore data to the backup client. This method can be performed by a backup module implemented on a backup server (e.g., backup module 120(3) of FIG. 1).

The method begins at 510, when the backup module detects a request to restore data to a backup client from backup. The restore request can be received via a network, via an email, or via a user interface. The restore request identifies the data to be restored along with the backup client to which the data should be restored. The restore request can identify the email address of the backup module on the backup client. Alternatively, this email address can be identified (e.g., using a table) based upon the identity of the backup client.

At 520, the backup module synthesizes the requested restore data and metadata, using techniques such as those described above. The backup module then sends an email containing the requested restore data and associated metadata to the backup client, as shown at 530. This email can also include commands performable (either by a backup module or a human) to effect the restore. The email can be encrypted and/or contain other security information.

Operations 510, 520, and 530 can be performed automatically, without human intervention. It is noted that other operations can be included instead of and/or in addition to those operations shown in FIG. 5.

Figure 6:
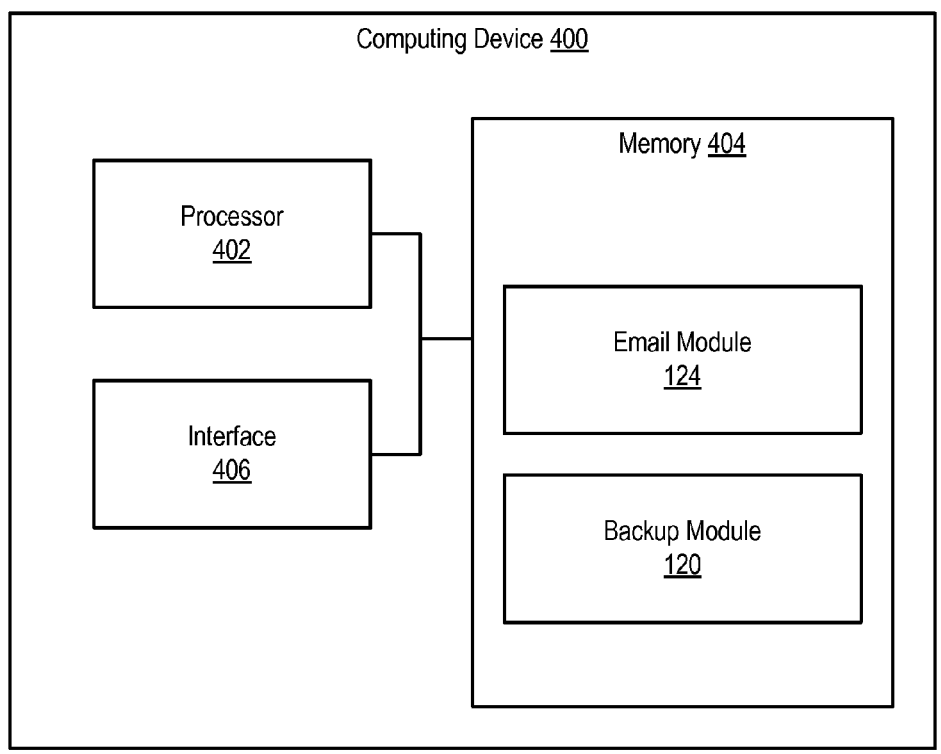
FIG. 6 is a block diagram of a computer system configured to use email to convey data and metadata between a backup client and a backup server during backups and restores, according to one embodiment of the present invention.

FIG. 6 is a block diagram of a computing device 400 that implements a backup module 120 (e.g., one of backup modules 120(1)-120(3) of FIG. 1) that can participate in email-based backups and restores. Computing device 400 can implement backup client 100(1) or media server 100(3) of FIG. 1. FIG. 4 illustrates how backup module 120 and email module 124 (e.g., one of email modules 124(1)-124(2) of FIG. 1) can be implemented in software. It is noted that, in at least some embodiments, email module 124 is integrated with backup module 120.

As illustrated, computing device 400 includes one or more processors 402 (e.g., microprocessors. PLDs (Programmable Logic Devices), or ASICs (Application Specific Integrated Circuits)) configured to execute program instructions stored in memory 404. Memory 404 can include various types of RAM (Random Access Memory), ROM (Read Only Memory), Flash memory, MEMS (Micro Electro-Mechanical Systems) memory, and the like. Computing device 400 also includes one or more interfaces 406. Processor 402, memory 404, and interface 406 are coupled to send and receive data and control signals by a bus or other interconnect.

Interface(s) 406 can include an interface to a storage device on which information to be backed up or restored is stored. Interface(s) 406 can also include an interface to a network (e.g., network 102 or Internet 103 of FIG. 1) for use in communicating with an email server in order to send and receive email.

The program instructions and data implementing backup module 120 can be stored on various computer readable media such as memory 404. In some embodiments, such software is stored on a computer readable medium such as a CD (Compact Disc), DVD (Digital Versatile Disc), hard disk, optical disk, tape device, floppy disk, and the like). In order be executed by processor 402, the instructions and data implementing backup module 120 are loaded into memory 404 from the other computer readable medium. The instructions and/or data can also be transferred to computing device 400 for storage in memory 404 via a network such as the Internet or upon a carrier medium. In some embodiments, a computer readable medium is a carrier medium such as a network and/or a wireless link upon which signals such as electrical, electromagnetic, or digital signals, on which the data and instructions implementing backup module 120 are encoded, are conveyed.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
   receiving a request to perform a restore, wherein
      the request comprises a restore email that specifies restore data;
   automatically generating an email in response to the request, wherein
      the email comprises the restore data and metadata,
      a portion of the restore data and the metadata is included in an attachment to the email,
      the restore data is stored on backup media,
      the metadata is associated with the restore data, and
      the email is addressed to a backup client;
   detecting whether the backup client is connected to a network; and
   selecting between email-based restore and network-based restore in response to the detecting, wherein
      the email-based restore is selected if the backup client is detected as not being connected to the network, and the email-based restore comprises sending the email, and
      the network-based restore is selected if the backup client is detected as being connected to the network, and the network-based restore does not comprise sending the email.

2. The method of claim 1, further comprising:
   validating the restore email, wherein
      the validating comprises at least one of: validating a source email address of the restore email and decrypting the restore email.

3. The method of claim 1, further comprising:
   identifying a location of the restore data, wherein
      the identifying comprises looking up the location in a backup catalog.

4. The method of claim 1, wherein
   the email comprises a set of one or more commands for performing a restore operation using the restore data and the metadata.

5. The method of claim 1, further comprising:
   receiving a second email, wherein
      the second email comprises a notification that the restore is complete.

6. The method of claim 1, wherein completion of the restore operation is configured to be delayed by virtue of the restore data and metadata being transmitted via email.

7. A non-transitory computer readable medium comprising program instructions executable to:
   receive a request to perform a restore, wherein
      the request comprises a restore email that specifies restore data;
   automatically generate an email in response to the request, wherein
      the email comprises the restore data and metadata,
      a portion of the restore data and the metadata is included in an attachment to the email,
      the restore data is stored on backup media,
      the metadata is associated with the restore data, and
      the email is addressed to a backup client;
   detect whether the backup client is connected to a network; and
   select between email-based restore and network-based restore in response to the detecting, wherein
      the email-based restore is selected if the backup client is detected as not being connected to the network, and the email-based restore comprises sending the email, and
      the network-based restore is selected if the backup client is detected as being connected to the network, and the network-based restore does not comprise sending the email.

8. The non-transitory computer readable medium of claim 7, wherein the program instructions are further executable to:
   validate the restore email, wherein
      validating the restore email comprises at least one of: validating a source email address of the restore email and decrypting the restore email.

9. The non-transitory computer readable medium of claim 7, wherein the program instructions are further executable to:
   identify a location of the restore data, wherein
      identifying the restore data comprises looking up the location in a backup catalog.

10. The non-transitory computer readable medium of claim 7, wherein
    the email comprises a set of one or more commands for performing a restore operation using the restore data and the metadata.

11. The non-transitory computer readable medium of claim 7, wherein the program instructions are further executable to:
    receive a second email, wherein
       the second email comprises a notification that the restore is complete.

12. A system comprising:
    a processor; and
    a memory coupled to the processor, wherein the memory stores program instructions executable by the processor to:
    receive a request to perform a restore, wherein
       the request comprises a restore email that specifies restore data;
    automatically generate an email in response to the request, wherein
       the email comprises the restore data and metadata,
       a portion of the restore data and the metadata is included in an attachment to the email,
       the restore data is stored on backup media,
       the metadata is associated with the restore data, and
       the email is addressed to a backup client;
    detect whether the backup client is connected to a network; and
    select between email-based restore and network-based restore in response to the detecting, wherein
       the email-based restore is selected if the backup client is detected as not being connected to the network, and the email-based restore comprises sending the email, and the network-based restore is selected if the backup client is detected as being connected to the network, and the network-based restore does not comprise sending the email.

13. The system of claim 12, wherein the program instructions are further executable to:
   validate the restore email, wherein
      validating the restore email comprises at least one of: validating a source email address of the restore email and decrypting the restore email.

14. The system of claim 12, wherein the program instructions are further executable to:
   identify a location of the restore data, wherein
      identifying the location of the restore data comprises looking up the location in a backup catalog.

15. The system of claim 12, wherein
   the email comprises a set of one or more commands for performing a restore operation using the restore data and the metadata.

16. The system of claim 12, wherein the program instructions are further executable to:
   receive a second email, wherein
      the second email comprises a notification that the restore is complete.

* * * * *